(12) United States Patent
Maruta et al.

(10) Patent No.: US 7,792,151 B2
(45) Date of Patent: Sep. 7, 2010

(54) CDMA RECEIVING APPARATUS AND METHOD

(75) Inventors: Yasushi Maruta, Tokyo (JP); Satoshi Oura, Tokyo (JP); Shinya Muraoka, Tokyo (JP)

(73) Assignee: NEC Corporation, Tokyo (JP)

( * ) Notice: Subject to any disclaimer, the term of this patent is extended or adjusted under 35 U.S.C. 154(b) by 902 days.

(21) Appl. No.: 10/590,343

(22) PCT Filed: Feb. 18, 2005

(86) PCT No.: PCT/JP2005/002586

§ 371 (c)(1),
(2), (4) Date: Aug. 24, 2006

(87) PCT Pub. No.: WO2005/083897

PCT Pub. Date: Sep. 9, 2005

(65) Prior Publication Data

US 2007/0177656 A1  Aug. 2, 2007

(30) Foreign Application Priority Data

Feb. 27, 2004 (JP) ............................. 2004-053409

(51) Int. Cl.
*H04J 13/00* (2006.01)
(52) U.S. Cl. .................... 370/479; 370/320
(58) Field of Classification Search ............... 370/441, 370/342, 335, 241
See application file for complete search history.

(56) References Cited

U.S. PATENT DOCUMENTS 6,434,366 B1 * 8/2002 Harrison et al. ............... 455/69
6,452,917 B1 * 9/2002 Leung ........................ 370/342
2003/0043775 A1 * 3/2003 Kikuchi ...................... 370/342
2003/0058823 A1 * 3/2003 Nishimura ................... 370/335
2004/0203397 A1 * 10/2004 Yoon et al. .................. 455/63.1
2005/0213529 A1 * 9/2005 Chow et al. ................. 370/320

FOREIGN PATENT DOCUMENTS

EP     1 343 339 A2    9/2003
JP     2001-333123     11/2001

(Continued)

OTHER PUBLICATIONS

Ghosh et al., "Shared Channels for Packet Data Transmission in W-CDMA", Vehicular Technology Conference, 1999, IEEE VTS 50$^{th}$, Sep. 19-22, 1999, pp. 943-947, vol. 2.

(Continued)

*Primary Examiner*—Huy D Vu
*Assistant Examiner*—Adnan Baig
(74) *Attorney, Agent, or Firm*—Scully, Scott, Murphy & Presser, P.C.

(57) ABSTRACT

A channel estimation circuit (12) of an individual CH path demodulation unit (1A-1L) performs a channel estimation from an individual CH. A channel estimation value correction circuit (22) of a shared CH path demodulation unit (2A-2L) then corrects a reception power fluctuation due to uplink transmission power control which is caused by the timing offset between the individual CH and the shared CH. The resultant data is used for the demodulation by a shared CH demodulation circuit (23).

12 Claims, 5 Drawing Sheets

FOREIGN PATENT DOCUMENTS

| | | |
|---|---|---|
| JP | 2002-111570 | 4/2002 |
| JP | 2003-018081 | 1/2003 |
| JP | 2003-069451 | 3/2003 |
| JP | 2003-523687 | 8/2003 |
| JP | 2003-289278 | 10/2003 |
| WO | WO 01/61878 A1 | 8/2001 |
| WO | WO 03/043214 A1 | 5/2003 |

OTHER PUBLICATIONS

Supplementary Partial European Search Report dated Mar. 19, 2010.

* cited by examiner

CDMA RECEIVING APPARATUS AND METHOD

TECHNICAL FIELD

The present invention relates to a wireless communication technique of a CDMA (Code Division Multiple Access) scheme and, more particularly, to a demodulation technique in a CDMA receiving apparatus used in a radio base station.

BACKGROUND ART

In a CDMA communication system, when each user terminal communicates with a base station by using the CDMA scheme, they use, as uplink communication channels (to be referred to as CHs hereinafter), an individual CH occupied by each user and a shared CH shared among all users. In this case, in many CDMA communication systems, an individual CH of each user and a shared CH are code-multiplexed with each other. At the time of demodulation, such a multiplexed channel is demultiplexed into an individual CH and a shared CH for each user to perform demodulation.

In this case, an individual CH is formed for each slot, the start timing of each slot is independently determined for each user at the time of call connection. Each slot comprises a Pilot portion and a Data portion. The Pilot portion accommodates a known symbol sequence determined for each slot in advance and is used to obtain a channel estimation value necessary for the demodulation of the Data portions of the individual CH and shared CH. The Data portion accommodates user data.

Since a shared CH is shared among all the users, although it is formed on a slot basis like an individual CH, the start timing is common to all the users and set in advance. The shared CH comprises only a Data portion. The Data portion accommodates user data. Since no Pilot portion exists in the shared CH, the shared CH can accommodate more user data than the individual CH.

It is obvious from the above description that the slot start timing difference between an individual CH and a shared CH changes for each user and is determined at the time of call connection. This is defined as a timing offset.

Conventionally, as a CDMA receiving apparatus used in such a CDMA communication system, an arrangement like that shown in FIG. 4 has been proposed (see, for example, Japanese Patent Laid-Open Nos. 2003-069451 and 2002-111570). This CDMA receiving apparatus comprises a reception antenna unit RA, a radio reception unit RX, and a plurality of user demodulation blocks. Although FIG. 4 shows only a user k demodulation block 1, other user demodulation blocks have similar arrangements.

The radio reception unit RX receives a signal in the radio band which is received by the reception antenna unit RA, performs processing such as amplification of the input signal, frequency conversion from the radio band to the baseband, quadrature detection, and analog/digital conversion, and outputs the result to the user k demodulation block 1. The user k demodulation block 1 comprises a path detection circuit 10, individual CH path demodulation units 1A to 1L, an individual CH RAKE combining circuit (to be referred to as a RAKE combining circuit) 14, shared CH path demodulation units 2A to 2L, and a shared CH RAKE combining circuit (to be referred to as a RAKE combining circuit) 24.

The path detection circuit 10 receives an output from the radio reception unit RX, detects the path delay of a user k individual CH signal with respect to the input signal, and notifies the individual CH path demodulation units 1A to 1L and the shared CH path demodulation units 2A to 2L of the path delay. In this case, the user A individual CH signal to the user k individual CH signal and the shared CH signal are multiplexed on the input signal, and multipath components of the respective signals which are produced by propagation delays are also multiplexed on the input signal.

As a method of multiplexing user individual CH signals and a shared CH, CDMA is generally used. However, TDMA (Time Division Multiple Access) can also be used to multiplex user individual CH signals. There are no limitations on a method of demultiplexing a plurality of multiplexed user signals, a method of detecting the path delays of multipath components, and the number of path delays to be detected.

In each of the individual CH path demodulation units 1A to 1L, an individual CH despreading circuit (to be referred to as a despreading circuit) 11 receives a radio reception output from the radio reception unit RX and the path delay of an individual CH path notified from the path detection circuit 10, and performs despreading operation for the radio reception output from the radio reception unit RX, thereby extracting a signal corresponding to a user k individual CH path. In addition, a channel estimation circuit (to be referred to as an estimation circuit hereinafter) 12 performs channel estimation on the basis of an output from the despreading circuit 11.

An individual CH demodulation circuit (to be referred to as a demodulation circuit hereinafter) 13 then receives an output from the despreading circuit 11 and a channel estimation value as an output from the estimation circuit 12, and demodulates the Data portion. With this operation, the Data portion is demodulated after the influence of the channel is removed therefrom by using a channel estimation value at the reception timing of the Data portion. The RAKE combining circuit 14 RAKE-combines the outputs from the individual CH path demodulation units 1A to 1L and outputs the user k individual CH demodulation result.

In each of the shared CH path demodulation units 2A to 2L, a shared CH despreading circuit (to be referred to as a despreading circuit hereinafter) 21 receives a radio reception output from the radio reception unit Rx and the path delay of an individual CH path which is notified from the path detection circuit 10, and performs despreading operation for the radio reception output from the radio reception unit RX, thereby extracting a signal corresponding to the user k shared CH path. A shared CH demodulation circuit (to be referred to as a demodulation circuit hereinafter) 23 receives an output from the despreading circuit 21 and a channel estimation value from one of the estimation circuits 12 corresponding to the individual CH path demodulation units 1A to 1L, and demodulates the Data portion of the shared CH.

With this operation, the Data portion of the shared CH is demodulated by removing the influence of the channel by using the transmission estimation value at the reception timing of the Data portion of the individual CH. The RAKE combining circuit 24 receives outputs from the shared CH path demodulation units 2A to 2L, RAKE-combines them, and outputs the user k shared CH demodulation result.

FIG. 5 shows an example of demodulating operation. As in this example, in demodulating the Data portions of an individual CH and shared CH, a channel estimation value is calculated first by using the Pilot portion of the individual CH. The Data portion of the individual CH is demodulated by removing the influence of the channel by using the channel estimation value of the self-slot or a channel estimation value at the reception timing of the Data portion which is obtained from the channel estimation values of the self-slot and several adjacent slots by interpolation. In addition, as in the case of the Data portion of the individual CH, the Data portion of the shared CH is demodulated by removing the influence of the channel by using the channel estimation value at the reception timing of the Data portion.

Uplink transmission power control is performed for each slot of an individual CH. Uplink transmission power to a shared CH is determined by giving a fixed or variable power offset to the uplink transmission power to an individual CH. Therefore, uplink transmission power control on a shared CH is performed on a slot basis with a predetermined time lag defined by a timing offset. In addition, no uplink transmission power control may be performed on a shared CH. That is, in some case, uplink transmission power is kept constant.

In this case, uplink transmission power control is the operation of comparing the uplink reception SIR (Signal to Interference Ratio) in a base station with a predetermined threshold, performing uplink transmission power increase control if the SIR is smaller than the threshold, and performing uplink transmission power decrease control if the SIR is larger than the threshold. As in the above CDMA radio communication system, according to the scheme of transmitting user data by using a shared CH, radio resources can be efficiently used. In addition, since all the users can be scheduled at common timings, this system is also suitable for control on the delay time of each user data.

DISCLOSURE OF INVENTION

Problem to be Solved by the Invention

According to such a conventional technique, however, if a timing offset exists and uplink transmission power control is executed, the demodulation accuracy of a shared CH deteriorates. With reference to FIG. 5 described above, consider a case wherein a timing offset exists between an individual CH and a shared CH and uplink transmission power control is executed.

Letting Tx(n) be a transmission signal of an individual CH in an arbitrary slot (n), and H(n) be a phase/amplitude fluctuation due to a channel including fading of the individual CH, i.e., a channel estimation value, a reception signal Rx(n) of the individual CH can be expressed by $$Rx(n)=H(n)\cdot Tx(n)$$

At the time of the demodulation of the individual CH, in order to restore Tx(n) in the above equation, the following computation is performed. In this case, H*(n) represents the complex conjugate of H(n).

$$Tx(n)=H^*(n)\cdot Rx(n)$$

Letting tx(n) be a transmission signal of a shared CH at an arbitrary slot number n, and h(n) be the channel estimation value of the shared CH, a reception signal rx(n) of the shared CH can be expressed as follows:

$$rx(n)=h(n)\cdot tx(n)$$

Assume that no timing offset exists. In this case, letting H(n) be the channel estimation value of the individual CH in the arbitrary slot (n) and $A_{OFFSET}$ be a coefficient obtained from a predetermined power offset $P_{OFFSET}$ of the shared CH corresponding to the individual CH, the channel estimation value h(n) used for the demodulation of the shared CH is calculated as follows:

$$h(n)=A_{OFFSET}\cdot H(n)$$

In order to restore tx(n) in the above equation at the time of the demodulation of the shared CH, the following computation is performed. In this case, "*" represents a complex conjugate.

$$tx(n) = h^*(n)\cdot rx(n)$$
$$= A_{OFFSET}\cdot H^*(n)\cdot rx(n)$$

If the slot number of a symbol of an individual CH used for channel estimation shifts from the slot number of a symbol of a shared CH, which is to be demodulated, due to a timing offset as indicated by a symbol m in FIG. 5, the above equation is rewritten as follows:

$$tx(n) = h^*(n)\cdot rx(n)$$
$$= A_{OFFSET}\cdot H^*(n+1)\cdot rx(n)$$

Letting Δ be a coefficient obtained from a reception power fluctuation due to uplink transmission power control from the slot (n) to the slot (n+1), and α be a channel fluctuation due to the elapsed time from the slot (n) to the slot (n+1), H(n+1) is given by $$H(n+1)=\Delta\cdot(H(n)+\alpha)$$

As is obvious, therefore, h(n) obtained from H(n+1) contains a reception power fluctuation due to uplink transmission power control.

On the other hand, the symbol m of the shared CH contains only a channel fluctuation due to the elapsed time, but does not contain any reception power fluctuation due to uplink transmission power control. If, therefore, demodulation is performed by using the channel estimation value h(n) for the symbol m of the shared CH without any change, the demodulation accuracy of the shared CH deteriorates due to the influence of the reception power fluctuation caused by uplink transmission power control contained in h(n).

$$tx(n) = h^*(n)\cdot rx(n)$$
$$= A_{OFFSET}\cdot H^*(n+1)\cdot rx(n)$$
$$= A_{OFFSET}\cdot \Delta\cdot(H(n)+\alpha)^*\cdot rx(n)$$

In contrast to this, the following is an equation which is originally required. In this case, represents a complex conjugate.

$$tx(n)=A_{OFFSET}\cdot(H(n)+\alpha)^*\cdot rx(n)$$

It is also obvious from the above equation that an error corresponding to the coefficient Δ obtained from a reception power fluctuation due to uplink transmission power control at the time of the demodulation of the shared CH has occurred.

Means of Solution to the Problem

The present invention has been made to solve such problems, and has as its object to provide a CDMA receiving apparatus and method which can prevent a deterioration in the demodulation accuracy of a shared CH even if a timing offset exists between an individual CH and a shared CH and uplink transmission power control is executed.

A CDMA receiving apparatus according to the present invention comprises a radio reception unit which outputs a radio reception output in an uplink communication channel on which an individual channel occupied by each user and a shared channel shared among all users are multiplexed on the basis of a CDMA scheme, by performing signal processing for a radio band signal received by a reception antenna, a channel estimation circuit which receives a signal corresponding to an individual channel of an arbitrary user which is obtained by performing despreading operation for the radio reception output, and calculates a channel estimation value indicating phase and amplitude fluctuations due to a channel from phase/amplitude information after despreading of a known Pilot portion symbol, a channel estimation value correction circuit which corrects the channel estimation value from the channel estimation circuit on the basis of a reception power fluctuation due to uplink transmission power control which is caused by a timing offset between the individual channel of the user and the shared channel, and a shared channel demodulation circuit which demodulates a signal corresponding to the shared channel of the user which is obtained by performing despreading operation for the radio reception output on the basis of the channel estimation value corrected by the channel estimation value correction circuit.

In addition, a CDMA receiving method according to the present invention comprises the radio reception step of outputting a radio reception output in an uplink communication channel on which an individual channel occupied by each user and a shared channel shared among all users are multiplexed on the basis of a CDMA scheme, by performing signal processing for a radio band signal received by a reception antenna, the channel estimation step of receiving a signal corresponding to an individual channel of an arbitrary user which is obtained by performing despreading operation for the radio reception output, and calculating a channel estimation value indicating phase and amplitude fluctuations due to a channel from phase/amplitude information after despreading of a known Pilot portion symbol, the channel estimation value correction step of correcting the channel estimation value from the channel estimation circuit on the basis of a reception power fluctuation due to uplink transmission power control which is caused by a timing offset between the individual channel of the user and the shared channel, and the shared channel demodulation step of demodulating a signal corresponding to the shared channel of the user which is obtained by performing despreading operation for the radio reception output on the basis of the channel estimation value corrected in the channel estimation value correction step.

Effects of the Invention

According to the present invention, since the data obtained by correcting a reception power fluctuation due to uplink transmission power control which is caused by the timing offset between an individual CH and a shared CH with respect to a channel estimation value in the individual CH is used for the demodulation of the shared CH, a deterioration in the demodulation accuracy of the shared CH can be prevented even if a timing offset exists and uplink transmission power control is executed.

BEST MODE FOR CARRYING OUT THE INVENTION

Figure 1:
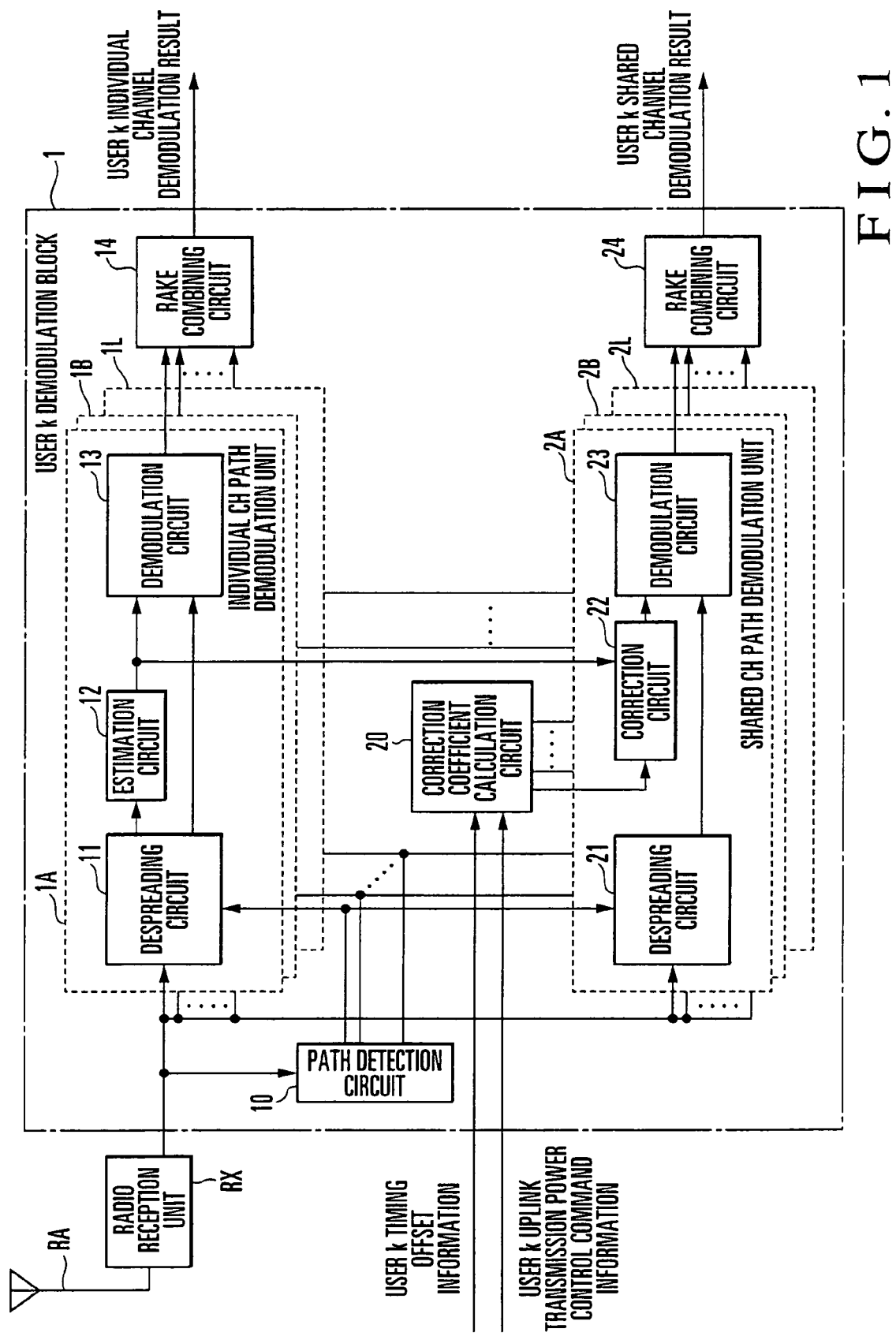
FIG. 1 is a block diagram showing the arrangement of a CDMA receiving apparatus according to an embodiment of the present invention.

An embodiment of the present invention will be described next with reference to the accompanying drawings.

[Outline of CDMA Receiving Apparatus]

A CDMA receiving apparatus according to this embodiment is a receiving apparatus used in a CDMA communication system comprising an individual channel (to be referred to as a CH hereinafter) which includes a Pilot portion and is used to perform uplink transmission power control and a shared CH which is used to perform demodulation by using the channel estimation value of the individual CH. In this apparatus, after channel estimation is performed from an individual CH, a reception power fluctuation due to uplink transmission power control which is caused by the timing offset between the individual CH and the shared CH, and the resultant data is used for the demodulation of the shared CH.

This embodiment is based on the assumption that when each user terminal communicates with a base station by using the CDMA scheme, the individual CH occupied by each user and the shared CH shared among all the users are used as uplink communication CHs. Assume that the individual CH and shared CH of each user are code-multiplexed with each other, and can be demultiplexed at the time of demodulation. Note that a multiplex scheme other than CDMA can be applied to the present invention as long as the individual CH and shared CH of each user are code-multiplexed with each other, and can be demultiplexed at the time of demodulation.

An individual CH is formed on a slot basis and the start timing of each slot is independently determined for each user at the time of call connection. Each slot comprises a Pilot portion and a Data portion. The Pilot portion accommodates a known symbol sequence determined for each slot in advance and is used to estimate a channel necessary for the demodulation of the Data portions of the individual CH and shared CH. The Data portion accommodates user data. Note that even when an individual CH comprises only a Pilot portion, the present invention can be applied to this apparatus.

Since a shared CH is shared among all the users, although it is formed on a slot basis like an individual CH, the start timing is common to all the users and set in advance. The shared CH comprises only a Data portion. The Data portion accommodates user data. Since no Pilot portion exists in the shared CH, the shared CH can accommodate more user data than the individual CH. It is therefore obvious that the slot start timing difference between an individual CH and a shared CH, i.e., a timing offset, changes for each user and is determined at the time of call connection, and hence can be acquired for each user.

Uplink transmission power control is performed for each slot of an individual CH. Uplink transmission power to a shared CH is determined by giving a fixed or variable power offset to the uplink transmission power to an individual CH. In this case, uplink transmission power control is the operation of comparing the uplink reception SIR (Signal to Interference Ratio) in a base station with a predetermined threshold, performing uplink transmission power increase control if the SIR is smaller than the threshold, and performing uplink transmission power decrease control if the SIR is larger than the threshold.

Uplink transmission power control on a shared CH is therefore performed on a slot basis with a predetermined time lag defined by a timing offset. In addition, no uplink transmission power control may not be performed on a shared CH. That is, in some case, uplink transmission power is kept constant. A transmission power fluctuation in a user terminal which is generated in accordance with an uplink transmission power control command is directly observed as a reception power fluctuation in a base station. This makes it possible to estimate a reception power fluctuation due to uplink transmission power control in each slot from uplink transmission power control command information transmitted as a downstream signal.

In the CDMA receiving apparatus according to this embodiment, after channel estimation is performed from an individual CH, a reception power fluctuation due to uplink transmission power control which is caused by the timing offset between the individual CH and the shared CH, and the resultant data is used for the demodulation of the shared CH, thereby preventing a deterioration in the demodulation accuracy of the shared CH.

[Arrangement of CDMA Receiving Apparatus]

Figure 4:
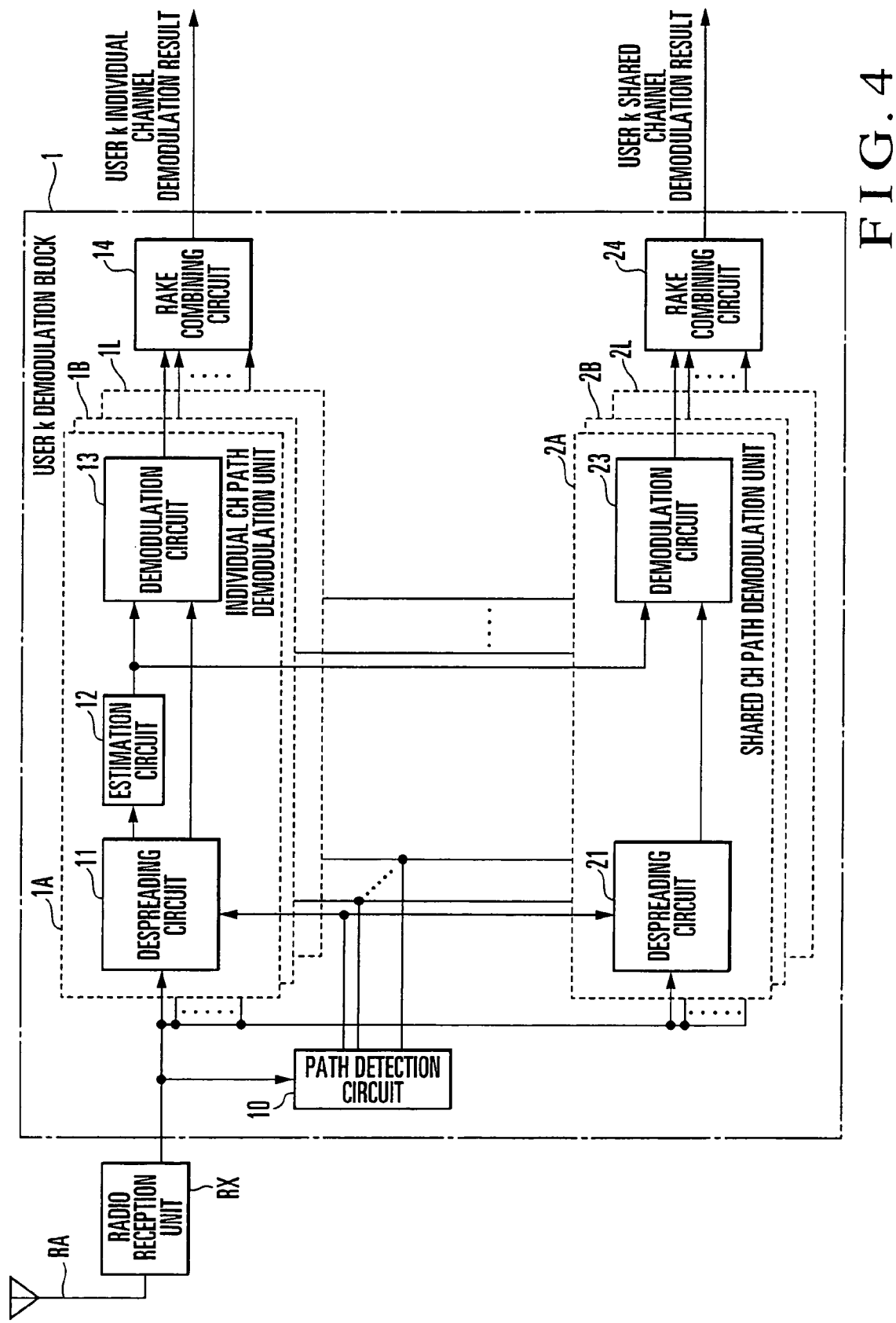
FIG. 4 is a block diagram showing the arrangement of a conventional CDMA receiving apparatus.
Figure 5:
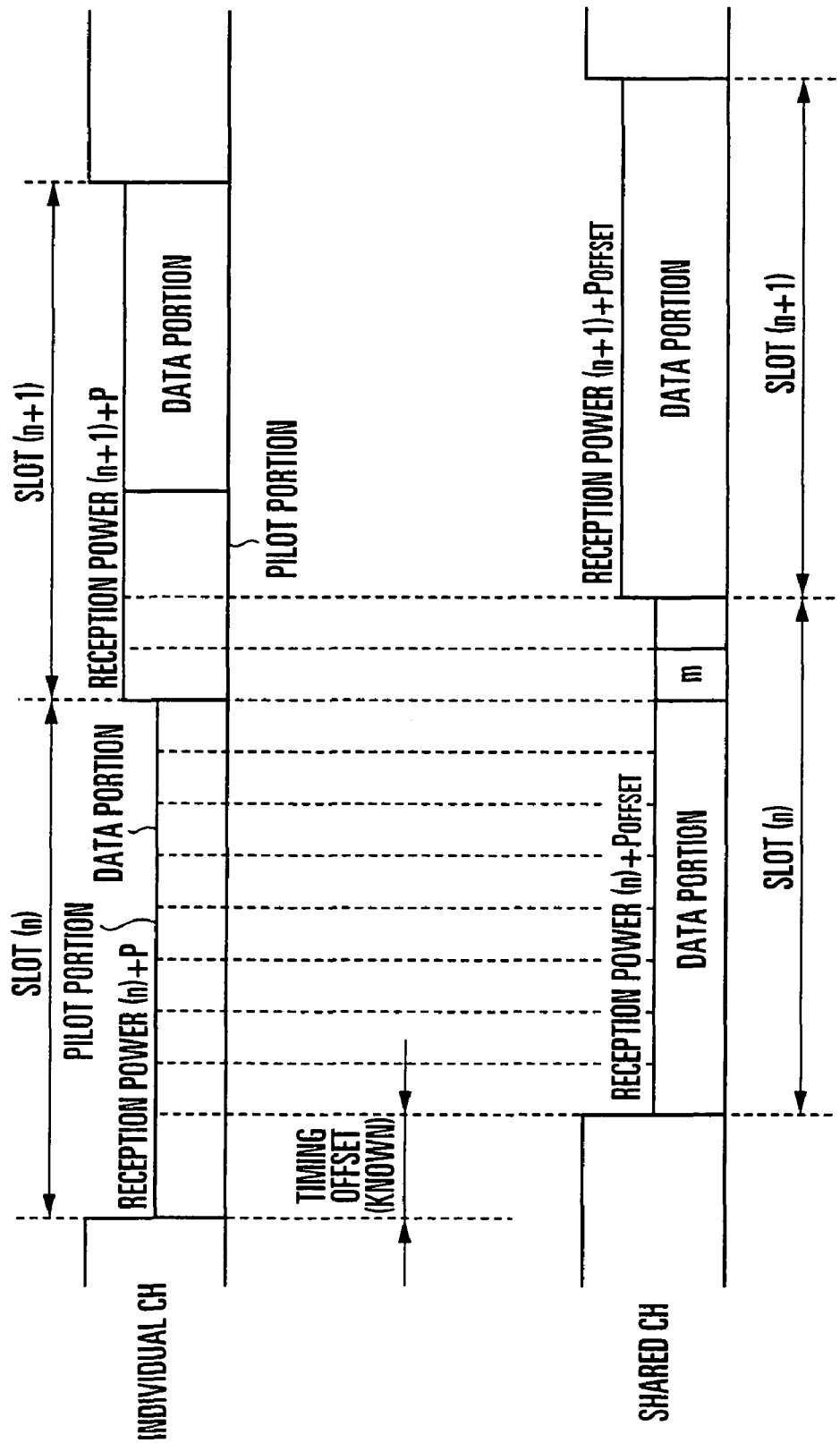
FIG. 5 is a timing chart showing the operation of the conventional CDMA receiving apparatus.

The CDMA receiving apparatus according to an embodiment of the present invention will be described next with reference to FIG. 1. Note that the same reference numerals as in FIG. 4 described above denote the same or similar parts in the block diagram of FIG. 1 showing the CDMA receiving apparatus according to an embodiment of the present invention. The CDMA receiving apparatus in FIG. 1 comprises a reception antenna unit RA, a radio reception unit RX, and a plurality of user demodulation blocks. Although FIG. 1 shows only a user k demodulation block 1, other user demodulation blocks have similar arrangements. Note that both the number k of users and the number L of paths which can be demodulated are positive integers, and are not limited to any specific values.

The reception antenna unit RA comprises one or more reception antenna elements. Note that the number of reception antenna elements is not limited. In addition, no limitations are imposed on the directivity of each antenna element within the horizontal and vertical planes. For example, each antenna element may have omni-directivity or dipolar directivity.

The radio reception unit RX comprises a low-noise amplifier, band limiting filter, mixer, local oscillator, AGC (Auto Gain Controller), quadrature detector, low-pass filter, analog/digital converter, and the like (not shown). The radio reception unit RX receives a signal in the radio band which is received by the reception antenna unit RA, performs amplification of the input signal, frequency conversion from the radio band to the baseband, quadrature detection, analog/digital conversion, and the like, and outputs the resultant data to the user k demodulation block 1.

The user k demodulation block 1 comprises a path detection circuit 10, a reception power difference correction coefficient calculation circuit (to be referred to as a correction coefficient calculation circuit hereinafter) 20, individual CH path demodulation units 1A to 1L, a RAKE combining circuit 14, shared CH path demodulation units 2A to 2L, and a RAKE combining circuit 24.

The path detection circuit 10 receives an output from the radio reception unit RX, detects the path delay of a user k individual CH signal with respect to the input signal, and notifies the individual CH path demodulation units 1A to 1L and the shared CH path demodulation units 2A to 2L of the path delay. In this case, the user A individual CH signal to the user k individual CH signal and the shared CH signal are multiplexed on the input signal, and multipath components of the respective signals which are produced by propagation delays are also multiplexed on the input signal.

As a method of multiplexing user individual CH signals and a shared CH, CDMA is generally used. However, TDMA (Time Division Multiple Access) can also be used to multiplex user individual CH signals. There are no limitations on a method of demultiplexing a plurality of multiplexed user signals, a method of detecting path delays, and the number of path delays to be detected.

The correction coefficient calculation circuit 20 receives the timing offset information of the user k and the uplink transmission power control command information for the user k, and outputs a reception power difference correction coefficient for correcting a reception power fluctuation due to uplink transmission power control which is caused by a timing offset. A reception power difference correction coefficient for correcting a reception power fluctuation is calculated by estimating a reception power fluctuation corresponding to an uplink transmission power control command in a timing offset interval.

In this case, if the uplink transmission power of a shared CH is determined by providing a fixed or variable power offset ($P_{OFFSET}$) with respect to the uplink transmission power of an individual CH, a reception power difference correction coefficient can also be calculated in consideration of the power offset. Note that a reception power difference correction coefficient is calculated from the timing offset information of the user k and the uplink transmission power control command information of the user k regardless of the path.

Each of the individual CH path demodulation units 1A to 1L comprises a despreading circuit 11, estimation circuit 12, and demodulation circuit 13. The despreading circuit 11 receives a radio reception output from the radio reception unit RX and the path delay of the individual CH notified from the path detection circuit 10, performs despreading operation for the output from the radio reception unit, and extracts a signal corresponding to the individual CH of the user k.

The estimation circuit 12 receives the output from the despreading circuit 11 and calculates a channel estimation value indicating a phase/amplitude fluctuation due to the channel from the phase/amplitude information obtained after despreading of a known Pilot portion symbol. This channel estimation value changes for each path, and is used for the demodulation of the individual CH portion provided for the individual CH demodulation circuit and provided for a channel estimation value correction circuit (to be referred to as a correction circuit) 22. This channel estimation value can be obtained from the Pilot portion symbol of the self-slot or the channel estimation values of the self-slot and several adjacent slots by interpolation. Note that no limitations are imposed on the number of slots to be used and an interpolation method to be used.

When a channel estimation value is provided for the correction circuit 22, the hard decision result on the Data portion of the individual CH can be handled in the same manner as a Pilot portion symbol, and a channel estimation value can be calculated from phase/amplitude information after despreading operation for the hard decision result on the Data portion symbol of the individual CH. Using this method makes it possible to improve the accuracy of a channel estimation value at the reception timing of a shared CH.

The demodulation circuit 13 receives an output from the despreading circuit 11 and a channel estimation value as an output from the estimation circuit 12, and demodulates the Data portion. The Data portion is demodulated by removing the influence of the channel by using a channel estimation value at the reception timing of the Data portion. A RAKE combining circuit 14 combines outputs from the individual CH path demodulation units 1A to 1L and outputs the user k individual CH demodulation result.

Each of the shared CH path demodulation units 2A to 2L comprises a despreading circuit 21, the correction circuit 22, and a demodulation circuit 23. The despreading circuit 21 receives a radio reception output from the radio reception unit RX and the path delay of an individual CH which is notified from the path detection circuit 10, performs despreading operation for the radio reception output from the radio reception unit RX, and extracts a signal corresponding to the user k shared CH path.

The correction circuit 22 receives a channel estimation value as an output from the estimation circuit 12 and a reception power difference correction coefficient as an output from the correction coefficient calculation circuit 20, and calculates and outputs a corrected channel estimation value by applying the reception power difference correction coefficient to the channel estimation value. Since a channel estimation value changes for each path, a corrected channel estimation value is calculated for each path.

The demodulation circuit 23 receives an output from the despreading circuit 21 and corrected channel estimation values from the individual CH path demodulation units 1A to 1L, and demodulates the Data portion of a shared CH. With this operation, the Data portion of the shared CH is demodulated by removing the influence of the channel by using the channel estimation value at the reception timing of the Data portion of the individual CH. The RAKE combining circuit 24 receives outputs from the shared CH path demodulation units 2A to 2L, and RAKE-combines the outputs, thereby outputting the user k shared CH demodulation result.

[Operation of CDMA Receiving Apparatus]

The operation of the CDMA receiving apparatus according to this embodiment will be described next with reference to FIG. 2.

Figure 2:
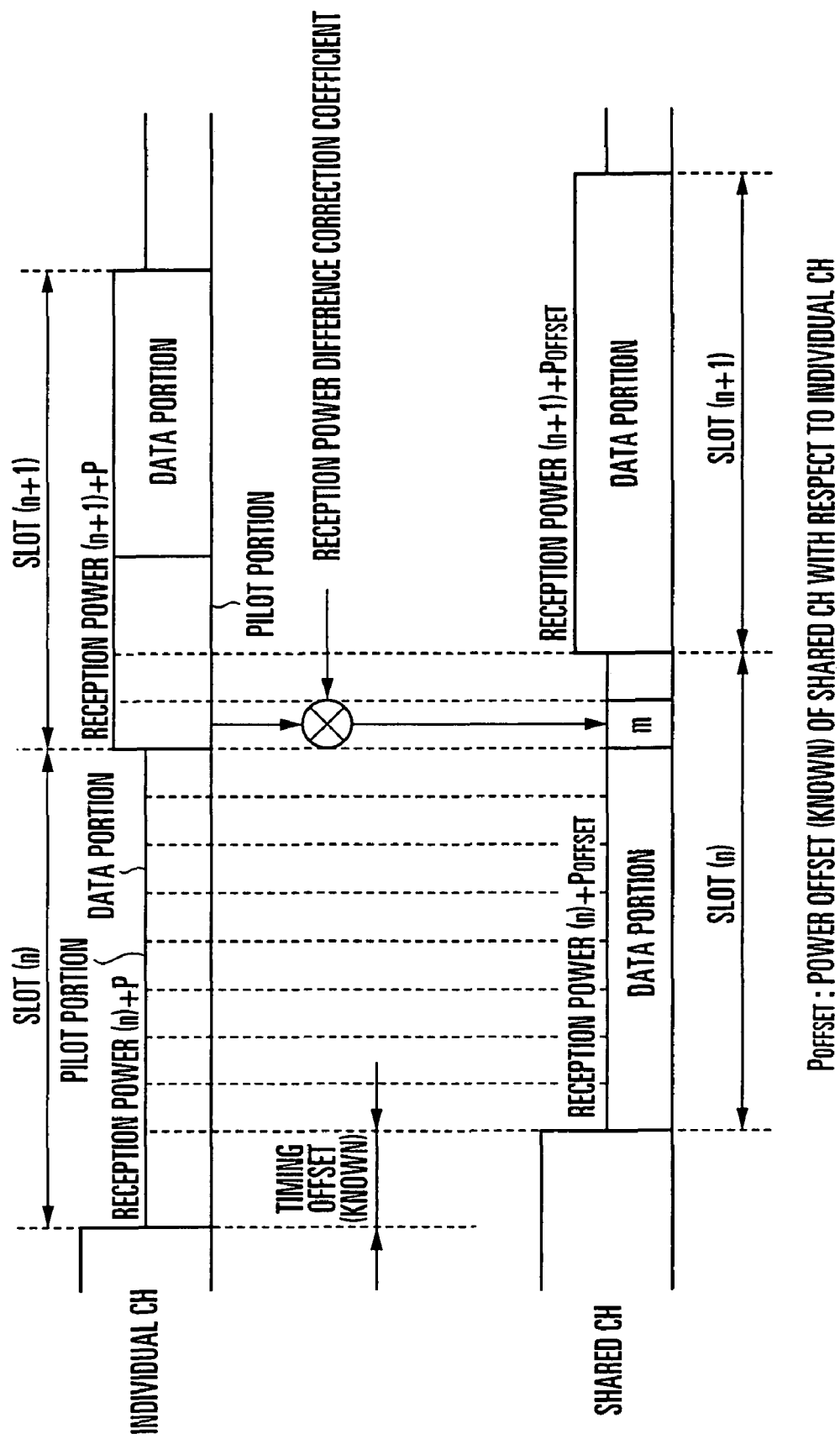
FIG. 2 is a timing chart showing the operation of a CDMA receiving apparatus according to an embodiment of the present invention.

Assume that, as indicated by the flowchart of FIG. 2, first of all, a timing offset exists between an individual CH and a shared CH and a channel estimation value in an arbitrary path of an arbitrary user k for which uplink transmission power control is executed is to be corrected. Letting $Tx(n)$ be a transmission signal of an individual CH in an arbitrary slot (n), and $H(n)$ be a channel estimation value as an output from the estimation circuit 12, a reception signal $Rx(n)$ of the individual CH can be expressed by $$Rx(n)=H(n)\cdot Tx(n)$$

At the time of demodulation, in order to restore $Tx(n)$ in the above equation, the following computation is performed in the demodulation circuit 13. In this case, $H^*(n)$ represents the complex conjugate of $H(n)$.

$$Tx(n)=H^*(n)\cdot Rx(n)$$

Letting $tx(n)$ be a transmission signal of a shared CH at an arbitrary slot number n, and $h(n)$ be the channel estimation value of the shared CH, a reception signal $rx(n)$ of the shared CH can be expressed as follows:

$$rx(n)=h(n)\cdot tx(n)$$

Assume that no timing offset exists between an individual CH and a shared CH. In this case, letting $H(n)$ be the channel estimation value of the individual CH in the arbitrary slot (n) and $A_{OFFSET}$ be a coefficient obtained from a predetermined power offset $P_{OFFSET}$ of the shared CH corresponding to the individual CH, the channel estimation value $h(n)$ used for the demodulation of the shared CH is calculated as follows:

$$h(n)=A_{OFFSET}\cdot H(n)$$

In order to restore $tx(n)$ in the above equation at the time of the demodulation of the shared CH, the following computation is performed in the demodulation circuit 23. In this case, "*" represents a complex conjugate.

$$tx(n) = h^*(n)\cdot rx(n)$$
$$= A_{OFFSET}\cdot H^*(n)\cdot rx(n)$$

If the slot number of a symbol of an individual CH used for channel estimation shifts from the slot number of a symbol of a shared CH, which is to be demodulated, due to a timing offset as in the case of a symbol m, the above equation is rewritten as follows:

$$tx(n) = h^*(n)\cdot rx(n)$$
$$= A_{OFFSET}\cdot H^*(n+1)\cdot rx(n)$$

Letting $\Delta$ be a coefficient obtained from a reception power fluctuation due to uplink transmission power control from the slot (n) to the slot (n+1), and $\alpha$ be a channel fluctuation due to the elapsed time from the slot (n) to the slot (n+1), $H(n+1)$ is given by $$H(n+1)=\Delta\cdot (H(n)+\alpha)$$

As is obvious, therefore, $h(n)$ obtained from $H(n+1)$ contains a reception power fluctuation due to uplink transmission power control. On the other hand, the symbol m of the shared CH contains only the channel fluctuation due to the elapsed time, but does not contain any reception power fluctuation due to uplink transmission power control.

In this embodiment, the correction coefficient calculation circuit 20 calculates a reception power difference correction coefficient for correcting a reception power fluctuation due to uplink transmission power control which is caused by a timing offset from the timing offset information of the user k and uplink transmission power control command information. The correction circuit 22 calculates a corrected channel estimation value by applying the reception power difference correction coefficient to the channel estimation value.

More specifically, first of all, the timing offset information of the user k is acquired and input to the correction coefficient calculation circuit 20. In this case, a timing offset is determined at the time of call connection. In addition, uplink transmission power control command information which is transmitted as a downstream signal in the interval from the start of reception of the slot (n) of the user k to the start of reception of the slot (n+1) is acquired and input to the correction coefficient calculation circuit 20.

The correction coefficient calculation circuit 20 then estimates a reception power fluctuation due to uplink transmission power control from the slot (n) of the user k to the slot (n+1) by using the uplink transmission power control command information transmitted as a downstream signal in the interval from the start of reception of the input slot (n) of the user k to the start of reception of the slot (n+1). In this case, it is thought that a transmission power fluctuation in the user terminal which occurs in accordance with the uplink transmission power control command is directly observed as a reception power fluctuation in a base station.

Letting CTPC be a reception power fluctuation coefficient estimated from the total sum of pieces of transmission power control command information transmitted as downstream signals, and A be a coefficient obtained from a reception power fluctuation due to uplink transmission power control from the slot (n) to the slot (n+1), the following approximate expression holds:

$$CTPC \approx \Delta$$

The correction coefficient calculation circuit 20 then calculates a reception power difference correction coefficient β which cancels out a reception power fluctuation due to uplink transmission power control in a timing offset interval by using a timing offset and an estimated reception power fluctuation due to uplink transmission power control, and outputs the calculated coefficient to the correction circuit 22.

$$\beta = CTPC^{-1} \text{ (inside the timing offset interval)}$$

$$\beta = 1 \text{ (outside the timing offset interval)}$$

The correction circuit 22 calculates a corrected channel estimation value by applying a reception power difference correction coefficient to the channel estimation value as an output from the estimation circuit 12. In this case, letting hc(n) be a corrected channel estimation value, hc(n) is represented by $$hc(n) = A_{OFFSET} \cdot \beta \cdot H(n+1)$$

Using the corrected channel estimation value for the demodulation of the symbol m in FIG. 2 makes it possible to remove the influence of reception power fluctuation due to uplink transmission power control which is caused by a timing offset.

$$\begin{aligned}
tx(n) &= hc^*(n) \cdot rx(n) \\
&= A_{OFFSET} \cdot \beta \cdot H^*(n+1) \cdot rx(n) \\
&= A_{OFFSET} \cdot \beta \cdot \Delta \cdot (H(n)+\alpha)^* \cdot rx(n) \\
&\doteqdot A_{OFFSET} \cdot (H(n)+\alpha)^* \cdot rx(n)
\end{aligned}$$

Since the following is an expression which is essentially required:

$$tx(n) = A_{OFFSET} \cdot (H(n)+\alpha)^* \cdot rx(n)$$

As is obvious from the above equation, an error at the time of demodulation of a shared CH can be removed. In this case, "*" represents a complex conjugate.

In this manner, after channel estimation is performed from an individual CH, a reception power fluctuation due to uplink transmission power control which is caused by the timing offset between the individual CH and the shared CH is corrected, and the resultant data is used for the demodulation of the shared CH. Even if, therefore, a timing offset exists between the individual CH and the shared CH and uplink transmission power control is executed, a deterioration in the demodulation accuracy of the shared CH can be prevented.

Figure 3:
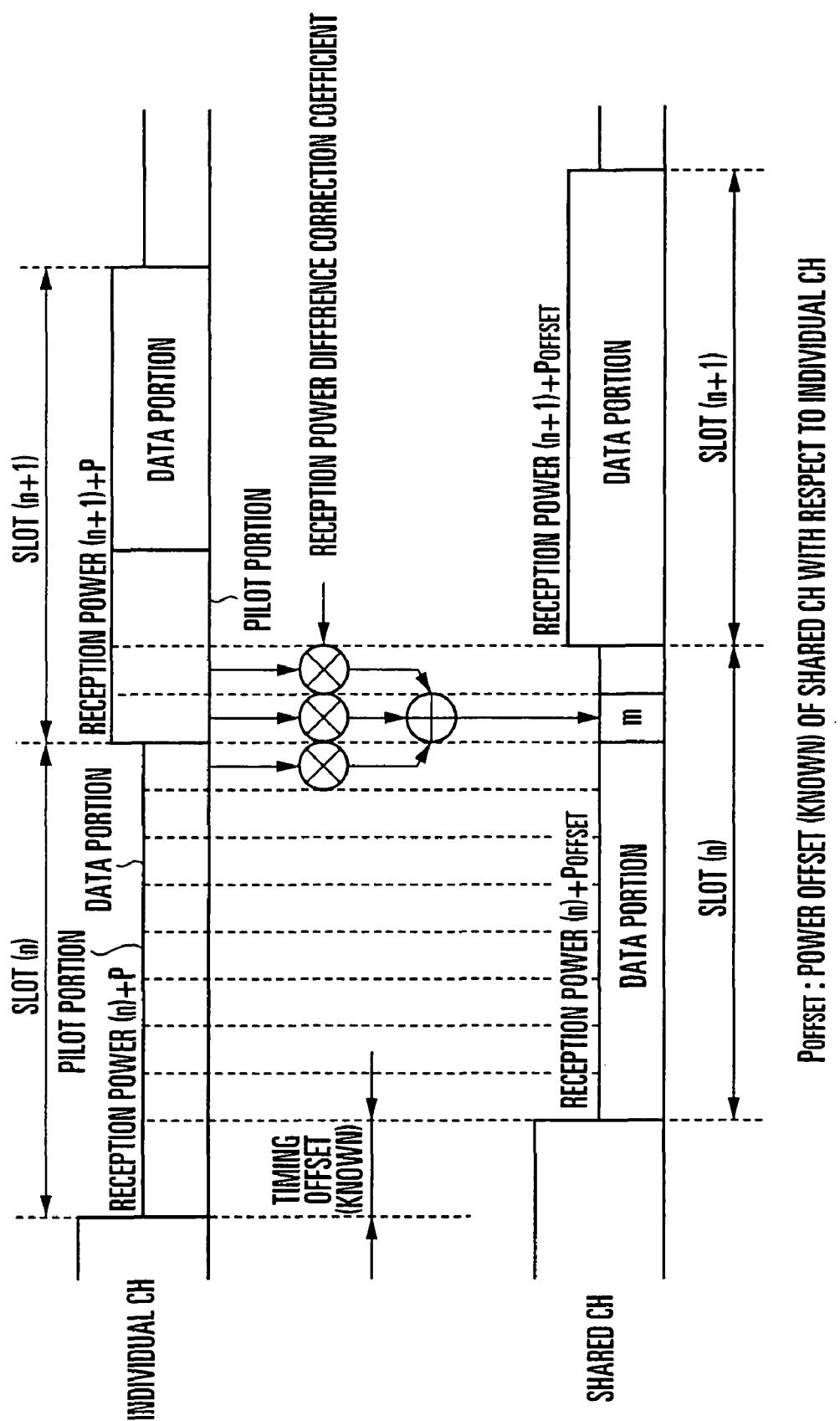
FIG. 3 is a timing chart showing another operation of the CDMA receiving apparatus according to an embodiment of the present invention.

In this case, as shown in FIG. 3, this technique can be applied to a case wherein in the demodulation of the Data portion of a shared CH, the result obtained by performing weighted averaging of channel estimation values at reception timings near the Data portion is used as a channel estimation value at the reception timing of the Data portion. In this case, the influence of a reception power fluctuation due to uplink transmission power control which is caused by a timing offset can be removed by performing weighted averaging after a reception power difference correction coefficient is applied to each channel estimation value.

INDUSTRIAL APPLICABILITY

The present invention is suitable for CDMA receiving apparatuses used in radio base stations constituting a mobile communication network such a cell phone network.

The invention claimed is:

1. A CDMA receiving apparatus characterized by comprising:
    a radio reception unit which outputs a radio reception output for an uplink communication channel on which an individual channel occupied by each user and a shared channel shared among all users are multiplexed on the basis of a CDMA scheme, by performing signal processing for a radio band signal received by a reception antenna;
    a channel estimation circuit which receives a signal corresponding to an individual channel of an arbitrary user which is obtained by performing despreading operation for the radio reception output, and calculates a channel estimation value indicating phase and amplitude fluctuations due to a channel from phase/amplitude information after despreading of a known Pilot portion symbol;
    a channel estimation value correction circuit which corrects the channel estimation value from said channel estimation circuit on the basis of a reception power fluctuation due to uplink transmission power control which is caused by a timing offset between the individual channel of the user and the shared channel; and
    a shared channel demodulation circuit which demodulates a signal corresponding to the shared channel of the user which is obtained by performing despreading operation for the radio reception output on the basis of the channel estimation value corrected by said channel estimation value correction circuit.

2. A CDMA receiving apparatus according to claim 1, characterized by further comprising a reception power difference correction coefficient calculation circuit which receives timing offset information of the user and uplink transmission power control command information, and calculates a reception power difference correction coefficient, which corrects a reception power fluctuation, by estimating a reception power fluctuation corresponding to an uplink power control command in a timing offset interval,
    wherein said channel value correction circuit corrects a channel estimation value from said channel estimation circuit on the basis of a reception power difference correction coefficient from said reception power difference correction coefficient calculation circuit.

3. A CDMA receiving apparatus according to claim 1, characterized in that said channel estimation value correction circuit corrects a plurality of channel estimation values before and after the timing which are obtained by said channel estimation circuit on the basis of the reception power fluctuation, and then outputs the channel estimation values after correction upon performing averaged weighting thereof.

4. A CDMA receiving apparatus according to claim 1, characterized by further comprising
    a path detection circuit which detects path delays associated with an individual channel and shared channel of the user from the radio reception output, an individual channel despreading circuit which outputs a
signal corresponding to the individual channel of the
user by performing despreading operation for the radio
reception output on the basis of the path delay of the
individual channel of the user, and a shared channel despreading circuit which outputs a signal
corresponding to the shared channel of the user by performing
despreading operation for the radio reception
output on the basis of the path delay of the shared channel
of the user.

5. A CDMA receiving apparatus according to claim 4,
characterized by further comprising an individual channel
demodulation circuit which demodulates a Data portion of
the individual channel of the user from the signal corresponding
to the individual channel on the basis of the channel
estimation value.

6. A CDMA receiving apparatus according to claim 5,
characterized by further comprising
an individual channel path demodulation unit, for each
individual channel of the user, which comprises said
individual channel despreading circuit, said channel
estimation circuit, and said individual channel demodulation
circuit,
an individual channel RAKE combining circuit which outputs
an individual channel demodulation result on the
user which is obtained by RAKE combining demodulation
outputs from said individual channel demodulation
circuits of said individual channel path demodulation
units,
a shared channel demodulation unit, for each shared channel
of the user, which comprises said shared channel
despreading circuit, said channel estimation value correction
circuit, and said shared channel demodulation
circuit, and
a shared channel RAKE combining circuit which outputs a
shared channel demodulation result on the user which is
obtained by RAKE combining demodulation outputs
from said shared channel demodulation circuits of said
shared channel path demodulation units.

7. A CDMA receiving method characterized by comprising:
the radio reception step of outputting a radio reception
output for an uplink communication channel on which
an individual channel occupied by each user and a
shared channel shared among all users are multiplexed
on the basis of a CDMA scheme, by performing signal
processing for a radio band signal received by a reception
antenna;
the channel estimation step of receiving a signal corresponding
to an individual channel of an arbitrary user
which is obtained by performing despreading operation
for the radio reception output, and calculating a channel
estimation value indicating phase and amplitude fluctuations
due to a channel from phase/amplitude information
after despreading of a known Pilot portion symbol;
the channel estimation value correction step of correcting
the channel estimation value calculated on the basis of a
reception power fluctuation due to uplink transmission
power control which is caused by a timing offset
between the individual channel of the user and the
shared channel; and
the shared channel demodulation step of demodulating a
signal corresponding to the shared channel of the user
which is obtained by performing despreading operation
for the radio reception output on the basis of the channel
estimation value corrected in the channel estimation
value correction step.

8. A CDMA receiving method according to claim 7, characterized
by further comprising the reception power difference
correction coefficient calculation step of receiving timing
offset information of the user and uplink transmission
power control command information, and calculating a
reception power difference correction coefficient, which corrects
a reception power fluctuation, by estimating a reception
power fluctuation corresponding to an uplink power control
command in a timing offset interval,
wherein the channel value correction step comprises the
step of correcting a calculated channel estimation value
on the basis of a calculated reception power difference
correction coefficient.

9. A CDMA receiving method according to claim 7, characterized
in that the channel estimation value correction step
comprises
the step of correcting a plurality of channel estimation
values before and after the obtained timing on the basis
of the reception power fluctuation, and
the step of outputting the channel estimation values after
correction upon performing averaged weighting thereof.

10. A CDMA receiving method according to claim 7, characterized
by further comprising
the path detection step of detecting path delays associated
with an individual channel and shared channel of the
user from the radio reception output,
the individual channel despreading step of outputting a
signal corresponding to the individual channel of the
user by performing despreading operation for the radio
reception output on the basis of the path delay of the
individual channel of the user, and
the shared channel despreading step of outputting a signal
corresponding to the shared channel of the user by performing
despreading operation for the radio reception
output on the basis of the path delay of the shared channel
of the user.

11. A CDMA receiving method according to claim 10,
characterized by further comprising the individual channel
demodulation step of demodulating a Data portion of the
individual channel of the user from the signal corresponding
to the individual channel on the basis of the channel estimation
value.

12. A CDMA receiving method according to claim 11,
characterized by further comprising
the individual channel path demodulation step, for each
individual channel of the user, which comprises the individual
channel despreading step, the channel estimation
step, and the individual channel demodulation step,
the individual channel RAKE combining step of outputting
an individual channel demodulation result on the user
which is obtained by RAKE combining demodulation
outputs from the individual channel demodulation steps
of the individual channel path demodulation steps,
the shared channel demodulation step, for each shared
channel of the user, which comprises the shared channel
despreading step, the channel estimation value correction
step, and the shared channel demodulation step, and
the shared channel RAKE combining step of outputting a
shared channel demodulation result on the user which is
obtained by RAKE combining demodulation outputs
from the shared channel demodulation steps of the
shared channel path demodulation steps.

* * * * *